Sept. 13, 1927.

C. M. FINLEY 1,642,542

TIRE CHAIN TOOL

Filed Jan. 20, 1927

Inventor
Charles M. Finley
By Lynn H. Latta
Attorney

Patented Sept. 13, 1927.

1,642,542

UNITED STATES PATENT OFFICE.

CHARLES M. FINLEY, OF SIOUX CITY, IOWA.

TIRE-CHAIN TOOL.

Application filed January 20, 1927. Serial No. 162,284.

My invention relates to a tool for facilitating the application of tire chains.

The object of my invention is to combine in a stretching tool, having the usual lever and link features, the desirable characteristics of simplicity, automatic locking of the links against release, and arrangement of the parts so that the lever, when the tool is in locked position, will assume a position which does not intersect any portion of the chain.

More specifically, referring to the last portion of the above mentioned object, my purpose is to provide a tool, all portions of which will lie upon one side of a straight line connecting the two points where the tool grips the chain, this side being remote from the adjacent ends of the chain, which are to be hooked together in order that the tool may not interfere with such hooking operation.

Another object of my invention is to provide a tool in which the above mentioned objects are attained by the use of simply a straight bar of metal to serve as the lever.

A still further object of my invention is to provide a tool combining with the above advantages, that of being foldable to occupy a compact, rectangular space.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1:
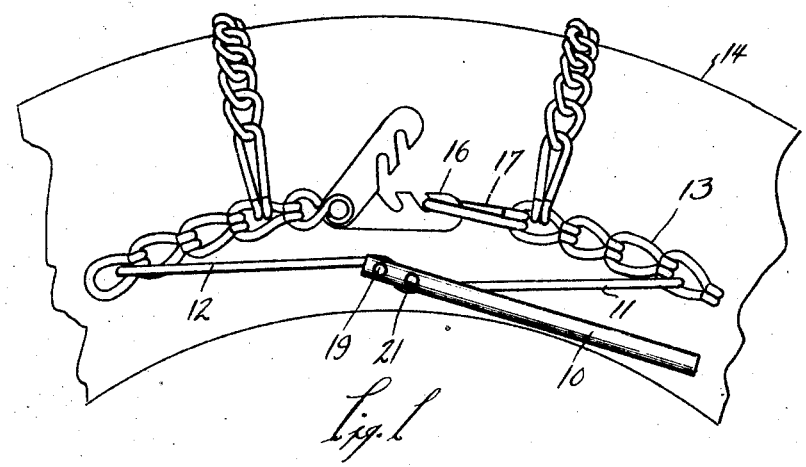
Fig. 1 is an elevation of a portion of a tire to which a chain is being attached by means of my tool.

I am aware that it is not new to provide a pulling tool, involving a lever and a link. The principle involved in such a tool has been applied in various ways, as for instance, in a device embodying a single link and a lever having one end hooked to engage the tire chain. Such a tool involves the utmost simplicity and yet is not entirely satisfactory in operation, due, first, to a limited range of pulling action, and second, to the lack of a locking feature and, third, to interference with the operation of hooking the chain by the lever, itself, if the tool is applied, so as to move the lever above the chain, which latter is preferable to swinging it downwardly, since it makes the operation more easy.

My tool embodies the lever 10 and links 11 and 12, which are pivoted to the lever at spaced points so that when the lever is in one position, relative to the links, they would be spread apart, and when the lever is moved through an arc of one hundred and eighty degrees, they would be drawn together twice the distance of their pivot points. The links 11 and 12 are so pivoted, relative to the lever, that they may swing through substantially an arc of one hundred and eighty degrees and thus may be positioned extending away from each other in opposed directions from their respective pivot points, substantially aligned with the lever so that the lever and links may be grasped simultaneously by one hand of the operator to maintain them in this position, preparatory to engaging the links of the side chains 13 of the non-skid chain. The chains are shown applied to a tire 14, the upper portion, thereof, being illustrated, since, ordinarily, when chains are applied, the free ends are brought together at the upper extremity of the wheel, in order to facilitate application of the chains. The ends of the links are hooked, as at 15.

The links, held as described in the foregoing paragraph, are now hooked one by one into the links of the side chains 13, and in so doing, the end of the chain which is hooked first may be pulled, by means of the tool, toward the other end, and this other end may be engaged by the free hand and pulled in the other direction, in order to preliminarily tighten the tire chain. During this operation, the lever 10 has been lying adjacent the link 12, and substantially aligned therewith. In order to tighten the chains together, and to provide enough slack so that the fastener 16 may be readily hooked into the link 17, the lever is swung upwardly and over to a position adjacent the link 11. It is desirable that the lever be moved as far as possible below the fastener and adjacent ends of the tire chains 13, and this is accomplished by arranging the parts as I will now describe.

Figure 2:
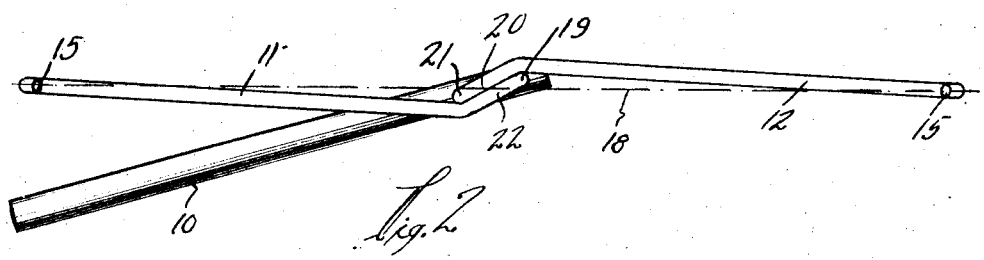
Fig. 2 is an inverted view of the tool occupying the position shown in Fig. 1.

The same arrangement provides for locking the links against movement away from each other toward their original position. In Fig. 2, an imaginary straight line joining the ends of the links 11 and 12 has been indicated at 18. The pull of the chains against links after the tool has been moved to the position shown in Fig. 1, in which the chains have been tightened toward each other, will be transmitted along this line 18. The link 12 is therefore bent so that the majority of its length lies above the line 18 sufficiently to pass above the neck 19 of the hook 11 which is journalled in the lever 10. From the point where the link passes the neck 19, it is bent downwardly as at 20 in order that its neck 21 may be journalled in the lever 10 below the line 18. Similarly, the major portion of the link 11 lies below the line 18 sufficiently to pass the neck 21 of the link 12, and is thence bent upwardly as at 22 in order that its neck 19 may be journalled above the line 18, as already stated. An inspection of Fig. 2 readily discloses that, owing to the staggered relation of the centers of the necks 19 and 21, respectively, a straight line passing therethrough, and extended toward the end of the link 11 will be positioned below the line 18 extending downwardly at an angle.

It will now be seen, referring again to Fig. 1, that in applying the tool, the lever has been swung from the left side upwardly toward the right, and thence downwardly below the straight line connecting the points of application to the chain.

It will be seen that it is advantageous to move the lever in a clock-wise direction and upwardly since this is the most natural way of handling the tool. In moving the lever on below the horizontal, the two necks 21 and 19 have been caused to cross the central line 18, in such a way that the pull of the chains upon the links will tend to urge the portions 20 and 22 into engagement with each other. Thus the tool will be locked automatically when it is swung to its extreme position and the hand of the operator may be moved from the lever to manipulate the fastening device. The tool will remain in that position in which it does not interfere with the work until a slight pressure upward against the lever will cause it to spring back to its original open position. Since the necks 19 and 21, when the links are locked in engagement with each other, assume positions along the line inclined downwardly from the central line 18, a straight bar may be used for the lever 10 and its manufacture thus simplified. The lever 10 is bent in the plane of the necks 19 and 21 to give an offset 25 for the purpose of spacing the handle portion of the lever away from the links. This allows the fingers of the operator to pass between the links and the lever.

Figure 3:
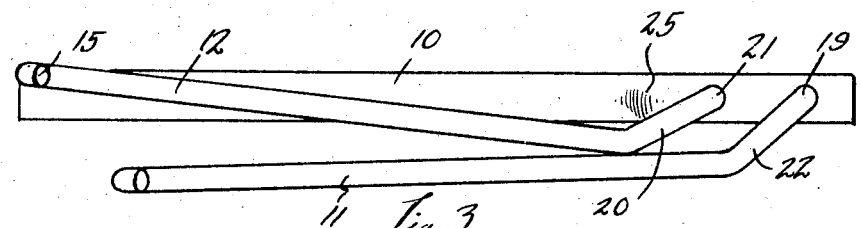
Fig. 3 is an inverted view of the tool folded, as when not in use.
Figure 4:
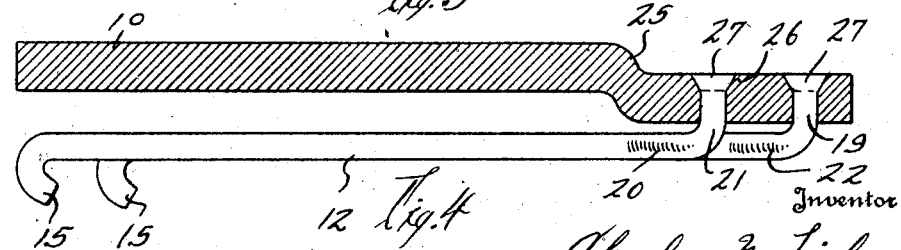
Fig. 4 is a longitudinal, sectional view through the tool, folded as in Fig. 3.

Referring to Fig. 3, it will be seen that the offset portions allow the links to be folded in substantially parallel relation so as to form a compact bundle which is substantially rectangular. This feature facilitates the packing of the tools in flat, retangular boxes. The necks 19 and 21 are secured to the lever 10 by providing counter-sunk openings 26 and upsetting the ends of the links, as at 27, to fill the counter-sunk openings.

Some changes may be made in the construction and arrangement of the parts of my invention without departing from the real spirit and purpose of my invention, and it is my intention to cover by my claims, any modified forms of structure or use of mechanical equivalents, which may be reasonably included within their scope.

I claim as my invention:

1. A stretching tool for tire chains, comprising a lever, a pair of links pivoted to the lever upon axes, spaced from each other near one end of the lever, that portion of each link extending from its pivot point to the pivot point of the other link, being bent at an angle to the remainder of its link sufficiently that the bent portion may extend around one side of the pivot point of the other link and allow the extremities of its link to be positioned on a line passing beyond the other side of the pivot point of the other link.

2. A stretching tool for tire chains, comprising a lever, a pair of links pivoted to the lever upon axes, spaced from each other near one end of the lever, that portion of each link extending from its pivot point to the pivot point of the other link, being bent at an angle to the remainder of its link sufficiently that the bent portion may extend around one side of the pivot point of the other link and allow the extremities of its link to be positioned on a line passing beyond the other side of the pivot point of the other link, said lever comprising a relatively straight bar and links being pivoted thereto at points lying substantially on the axis of the bar.

Signed this 14th day of December, 1926, in the county of Woodbury and State of Iowa.

CHARLES M. FINLEY.